Sept. 1, 1931. C. E. E. VAN ALLEN 1,821,334
SAFETY DEVICE
Filed Aug. 11, 1930 2 Sheets-Sheet 1

Inventor
Clark E. E. Van Allen

By *Clarence A. O'Brien*
Attorney

Sept. 1, 1931.  C. E. E. VAN ALLEN  1,821,334
SAFETY DEVICE
Filed Aug. 11, 1930    2 Sheets-Sheet 2

Inventor

Clark E. E. Van Allen

By *Clarence A. O'Brien*
Attorney

Patented Sept. 1, 1931

1,821,334

UNITED STATES PATENT OFFICE

CLARK ELLIOT E. VAN ALLEN, OF FORT PAYNE, ALABAMA

SAFETY DEVICE    REISSUED

Application filed August 11, 1930. Serial No. 474,473.

This invention relates to a safety device for vehicles and the primary object of the invention is to prevent a blown out tire from pulling a car off of its straight course, the same being accomplished by utilizing the brake on the opposite side of the car as a counterbalance through the medium of mechanism comprehended by the present invention.

As is well known, the drag or friction of a flat tire, and "drop" of the side of the car on the side where the flat tire is pulls the car or automobile toward that side. If the modern car, equipped with four wheel brakes has a blown-out tire on the right front wheel, the automobile immediately starts to swing toward the right, and the application of the brakes will tend to throw the automobile harder toward this side, because very little braking power is necessary on the right front wheel when the tire is flat, which results in the tendency of the brake power to lock the "flat" wheel before any of the other three wheels have received proper braking action.

With the above and numerous other objects in view, the invention consists in the combination, arrangement and details of construction hereinafter set forth and shown in the accompanying drawings and claimed.

Figure 1:
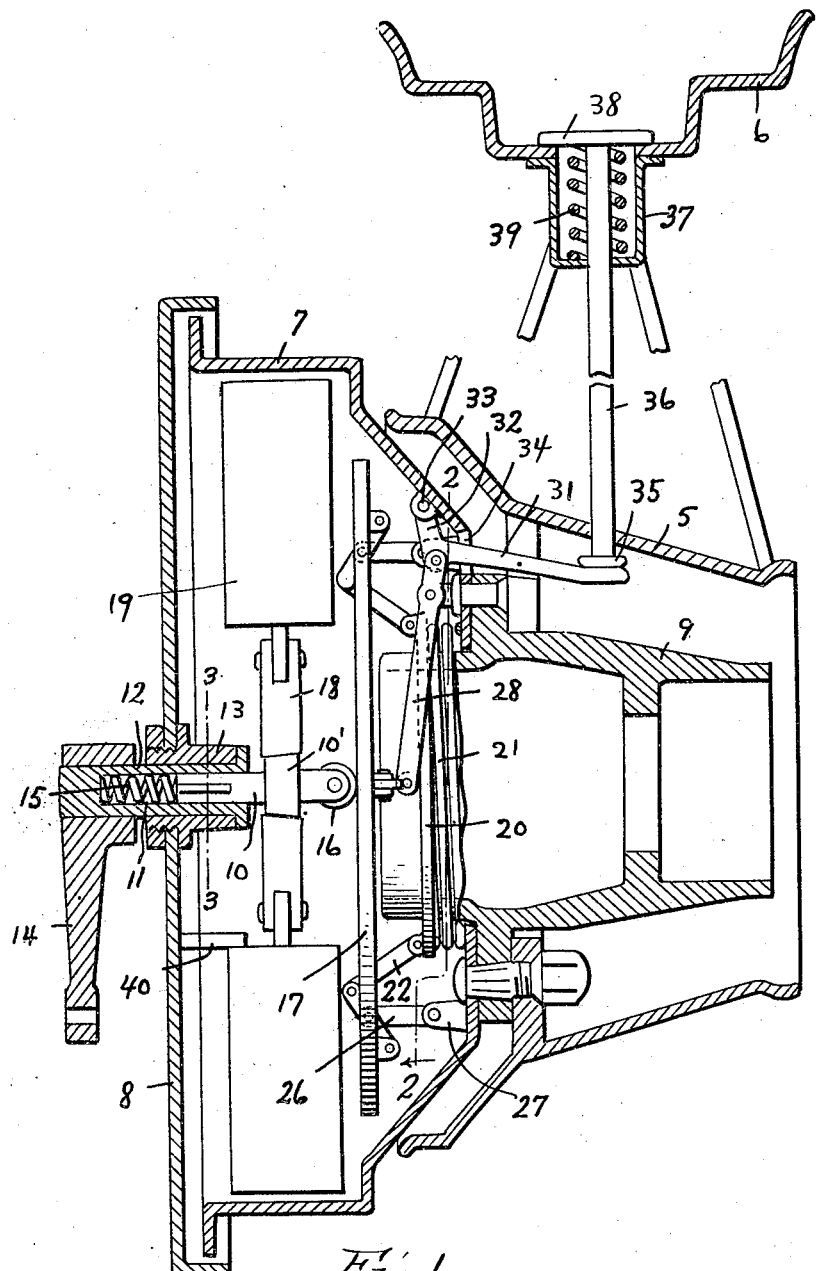
Figure 1 is a detail sectional view, taken through a brake and a portion of a tire rim and wheel, showing the application of the invention therewith.
Figure 2:
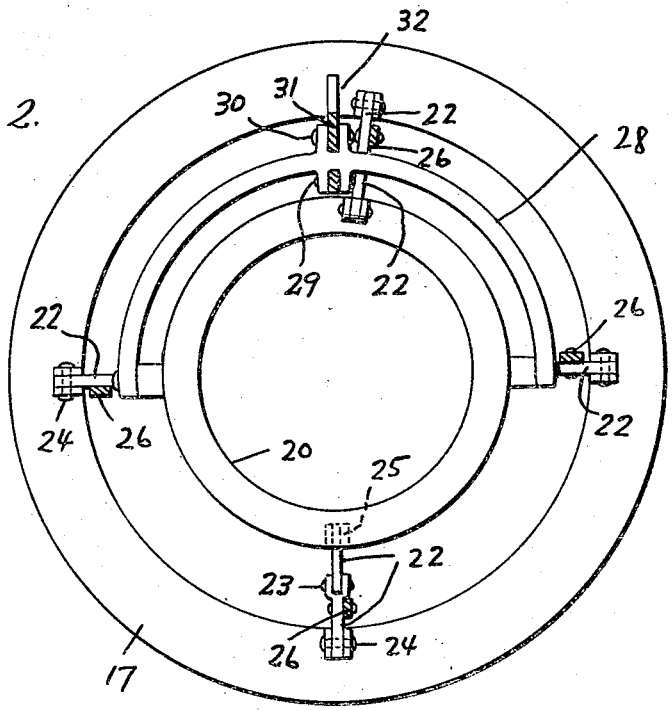
Figure 2 is a detail sectional view, taken substantially on the line 2—2 of Figure 1.
Figure 3:
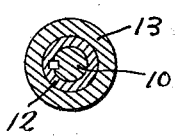
Figure 3 is a detail sectional view, taken substantially on the line 3—3 of Figure 1.

With reference more in detail to the drawings, it will be seen that the reference character 5 designates the hub of a conventional type of automobile wheel. The rim of the wheel is designated by the reference character 6. The wheel shown fragmentarily and in section represents a standard wire wheel. The brake drum with which the wheel is equipped is designated by the reference character 7 and is provided with the usual cover plate 8. The bearing housing of the wheel is designated by the reference character 9.

In carrying out the present invention, the brake cam 10 instead of being attached solidly to the brake arm is, in the present instance, slidably arranged in the bore 11 of the brake operating shaft 12. The cam 10 is suitably keyed to the shaft 12 for rotation with the shaft for permitting the cam 10 to move longitudinally relatively to the shaft 12. The shaft 12 is rotatably mounted in a suitable bearing 13 provided therefor on the cover plate 8, in the usual manner.

On its outer end, the shaft 12 is equipped with a suitable crank arm 14, adapted to engage with the control mechanism of the brake, the control mechanism not shown. Arranged in the bore 11 is a suitable spring for normally urging the cam 10 outwardly of the bore, the distance of three-fourths of an inch to an inch, and still maintain direct action of the brake arm. The spring 15 engaging the cam 10 will urge the same outwardly so that the cam rider 16 will be maintained at all times in contact with a ring 17, to hold the cam at its proper position so that the cam member 10' will suitably engage the inner ends of the conventional type of feet 18, which are operatively connected to the brake shoes 19 that are adapted to be moved into and out of frictional engagement with the periphery of the brake drum 7, as is well known in the art.

Normally disposed about the inner end of the bearing housing 9 is a relatively smaller ring 20, which is normally urged toward the ring 17, under the expansive action of a coil spring 21, convoluted about the bearing housing 9. Rings 17 and 20 are operatively connected together through the medium of a plurality of series of links 22. The links 22 are pivotally connected to the rings 17 and 20 as at 24 and 25 respectively. One link of each of the series of links 22 has a link connection 26 with lug 27 provided on the inner end of the brake drum 7.

A yoke 28 is pivotally mounted interiorly of the brake drum 7 as at 29. The yoke straddles the inner end of the bearing housing 9 and the free ends of the yoke are adapted to bear against ring 20, for normally urging the ring to the right of Figure 1, to compress spring 21. The shank of the yoke is pivotally connected, as at 30 to a lever 31, adjacent the offset end 32 of the lever. The offset end of the lever is pivoted to the wall of the brake drum 7 as at 33. The lever 31 is operable in a suitable slot 34 provided therefor in the wall of the brake drum 7; and said lever extends into the interior of the hub 5.

The outer end of the rod 36 is slidable in a radial casing or socket 37 mounted on the inner peripheral face of the wheel rim 6. At the last referred to end thereof the rod 36 normally projects outwardly of the casing 37, between the walls of the rim 6 and at said end is provided with a disk-like head or flange 38 normally resting on the inner face of the rim periphery. Thus it will be seen that the head 38 normally contacts with the tire on the rim 6, and acting against the pressure of the tire on the head or flange 38 is a coil spring 39. The coil spring 39 is arranged in the casing or socket 37, and bears against the head or disc 38 for normally urging said head 38 away from the adjacent end of the casing 37 and upwardly between the walls of the tire rim as is apparent.

In Figure 1, the parts are in a normal position, that is, the brake is in an "off" position or non-braking position and the head 35 is contacting the free end of the lever 31 under action of the pressure exerted on the disk-like head or flange 38, by a tire or the like (not shown) arranged on the rim 6.

Now, should the aforementioned tire be "blown" out or for any other reason, pressure on the head or flange 38, acting oppositely to the spring 39, be released, it will be seen that the rod 36 under action of the spring 39 will be moved radially with respect to the wheel, thus releasing pressure on the lever 31. This release of pressure on the lever 31 will obviously release pressure of the yoke against the ring 20 with the result that the spring 21 in a normally compressed condition, will expand, thus causing the ring 20 to move toward the left in Figure 1.

Through the medium of the links 22 connecting the rings 17 and 20, the ring 17 will move in an opposite direction with respect to the ring 20, or to the right in Figure 1, thus permitting the cam 10 to move inwardly or to the right in Figure 1, under the action of the spring 15, whereby the cam member 10′ is moved out of engagement with the links or feet 18, thus rendering the brake mechanism ineffective, that is, the brake mechanism of this particular wheel will not act in conjunction with the brakes of the remaining wheels of the automobile, for forcing the braking shoes 19 of the particular brake, into braking engagement with the periphery of the drum 7 as is apparent.

From the foregoing then, it will be seen that when a blow-out occurs in a particular tire whereby the mechanism is operated in a manner as just described for rendering the brake of this particular wheel inoperative, upon the flattening of the punctured tire and the dropping of the rim toward the ground. This flattening of the tire and dropping of the rim toward the ground would, immediately upon application of the brake pedal for operating the brakes of the several wheels, have a tendency to pull the vehicle toward that side of the road corresponding to the side of the vehicle on which the blown-out tire is mounted.

However, through the medium of this mechanism, the brake of the wheel, whose tire has been blown out will be immediately rendered inoperable for braking purposes, so that only a braking action is applied to each of the remaining wheels of the automobile, thus aiding the driver to maintain the vehicle upon its true course on the road, with a minimum of effort.

For example, if the blow-out occurs on the right front wheel, immediately the blow-out mechanism of the wheel is released and the brake on that wheel is useless for braking purposes, being rendered so by the operation of the blow-out mechanism. Immediately upon application of the foot pedal, the left brake will then act and afford a braking action for the left wheel, and this braking action applied to the left front wheel will react against the force of the flat tire on the right front wheel with the result that the driver of the vehicle may maintain the vehicle under full control and in its true course of travel.

Pins 40 are provided for engagement with the brake shoes 19 to limit or prevent the said shoes moving inwardly toward one another when cam 10′ is moved out of engagement with the links or feet 18 upon movement of the ring 17 toward the right in Figure 1. Otherwise, the shoes 19 would move inwardly toward one another to such an extent as would not permit cam 10′ being forced into its normal link or foot engaging position when ring 17 is forced to its normal position upon the repairing of the blown out tire.

Even though I have herein shown and described the preferred embodiment of my invention, it is to be understood that the same is susceptible to changes fully comprehended by the spirit of the invention as herein described and the scope of the appended claims.

What is claimed as new is:

1. A vehicle wheel brake comprising in combination a drum, radially movable brake shoes for movement into and out of engagement with the drum, cam means for controlling the movement of the brake shoes, and means operable upon a decrease in pressure in the tire of the vehicle wheel for moving said cam means out of brake effecting engagement with said shoes, whereby to render the brake ineffective with respect to the wheel upon application of the brake lever.

2. In combination, a vehicle wheel brake mechanism comprising a brake shoe controlling cam normally operatively engaged with the brake shoes, and means, normally acting against the pressure of the pneumatic tire of the vehicle wheel, for urging said cam out of operative connection with said brake shoes upon releasing of pressure in the pneumatic tire.

3. A wheel brake mechanism comprising in combination, a brake drum, radially movable brake shoes arranged in said drum, a rotatably mounted brake control shaft, a cam member movable axially and relatively to said shaft, yieldable means for normally urging said cam member out of operative engagement with said brake shoes, a rod supported on the rim of the vehicle wheel for movement radially to the wheel of the vehicle, said rod at one end adapted to engage the pneumatic tire of the vehicle wheel, and means controlled by said rod and normally acting oppositely to said yieldable means for retaining said cam member in operative engagement with said brake shoes.

4. A vehicle wheel brake comprising in combination, a brake drum, radially movable brake shoes arranged in said brake drum, a rockably mounted brake shaft, a cam member operatively connected to said shaft and movable axially relative to said shaft, said cam member normally operatively connected with said brake shoes, means for actuating said shoes into braking engagement with the brake drum upon rotation of said shaft, yieldable means normally urging the cam in one direction relative to said shaft, a radially disposed casing mounted on the wheel rim, a pressure responsive rod slidable through said casing, spring means arranged in said casing and engaging said rod for normally urging one end of the rod into contact with the pneumatic tire on the wheel rim, a ring arranged in said brake drum, normally engaging the free end of said cam, expansible means in said brake drum operatively connected with said ring, said expansible means acting oppositely to the said yieldable means engaging said cam, means normally maintaining said expansible means compressed, said last mentioned means including means actuatable upon the movement of said pressure responsive rod in one direction under action of the aforementioned spring engaging said rod, whereby said expansible means is released to move said cam in said opposite direction and out of operative engagement with said brake shoes.

5. A vehicle wheel brake comprising in combination, a brake drum, radially movable brake shoes arranged in said brake drum, a rockably mounted brake shaft, a cam member operatively connected to said shaft and movable axially relative to said shaft, said cam member normally operatively connected with said brake shoes, means for actuating said shoes into braking engagement with the brake drum upon rotation of said shaft, yieldable means normally urging the cam in one direction relative to said shaft, a radially disposed casing mounted on the wheel rim, a pressure responsive rod slidable through said casing, spring means arranged in said casing and engaging said rod for normally urging one end of the rod into contact with the pneumatic tire on the wheel rim, a ring arranged in said brake drum, normally engaging the free end of said cam, expansible means in said brake drum operatively connected with said ring, said expansible means acting oppositely to the said yieldable means engaging said cam, means normally maintaining said expansible means compressed, said last mentioned means including means actuatable upon the movement of said pressure responsive rod in one direction under action of the aforementioned spring engaging said rod, whereby said expansible means is released to move said cam in said opposite direction and out of operative engagement with said brake shoes, and the aforementioned means for compressing said expansible member comprising a second ring, a pivotally mounted yoke engaging said second ring normally urging the latter in one direction for compressing said expansible member, and means operatively connecting both of said rings together and to one wall of said brake drum.

6. A vehicle wheel brake comprising in combination, a drum, brake shoes for moving into and out of braking engagement with said drum, remote controlled cam means normally operatively connected with said shoes, normally compressed expansible means operably engaging said cam, and means operable upon a decrease of air pressure in the pneumatic tire of the vehicle wheel for releasing said expansible means for moving said cam out of operative engagement with said shoes.

7. A vehicle wheel brake comprising in combination, a drum, brake shoes for moving into and out of braking engagement with said drum, remote controlled cam means normally operatively connected with said shoes, normally compressed expansible means operably engaging said cam, and means operable upon a decrease of air pressure in the pneumatic tire of the vehicle wheel for releasing said expansible means for moving said cam out of operative engagement with said shoes, said last mentioned means including a member normally engaging said cam, a spring concentrically arranged in the drum of said brake, means for normally retaining said spring in a retracted position, said last mentioned means including means operatively connected to said member for normally urging said member in one direction, upon expansion of said spring.

8. In combination, a vehicle wheel brake mechanism including shiftable braking members, yieldable means for shifting said members, and means acting oppositely to said yieldable means for rendering said means ineffective for shifting said braking members upon a decrease of pressure in the tire of the wheel controlled by said brake.

9. A vehicle wheel brake including in combination, a shiftable member for moving the braking elements of the brake into and out of braking position, and oppositely acting means for normally retaining said shiftable member in operative position with respect to the braking elements, and operable upon a decrease in pressure in the tire of the vehicle wheel, for releasing said shiftable member and shifting the same out of operative engagement with the braking elements.

10. A vehicle wheel brake including in combination, a brake drum, brake shoes cooperable with said drum, cam means for shifting said shoes into and out of engagement with said drum, oppositely acting means for normally retaining said cam means in operative engagement with said shoes and including a yieldable member normally urging said cam means out of engagement with the brake shoes, normally contracted means for normally retaining said cam means in operative engagement with the shoes opposite to said yieldable member, and means controlled by the pressure of the air in the pneumatic tire of the wheel for normally retaining said contracted means in a contracted condition.

11. A vehicle wheel brake including in combination, cam means for moving the braking members into and out of operative engagement with the drum of the brake, said cam means having an axial portion movable axially with respect to the drum, and pressure responsive means for shifting said axial portion in one direction for moving said cam means out of operative engagement with the braking members of the brake, whereby to prevent a movement of the braking members into engagement with the brake drum, upon the application of the brake lever.

In testimony whereof I affix my signature.

CLARK ELLIOT E. VAN ALLEN.